(12) United States Patent
Boehm et al.

(10) Patent No.: US 9,221,051 B2
(45) Date of Patent: Dec. 29, 2015

(54) MICROFLUIDIC ELEMENT FOR ANALYSIS OF A SAMPLE LIQUID

(71) Applicant: Roche Diagnostics Operations, Inc., Indianapolis, IN (US)

(72) Inventors: Christoph Boehm, Viernheim (DE); Susanne Wuerl, Mannheim (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 73 days.

(21) Appl. No.: 13/872,686

(22) Filed: Apr. 29, 2013

(65) Prior Publication Data

US 2013/0243664 A1    Sep. 19, 2013

Related U.S. Application Data

(63) Continuation of application No. PCT/EP2011/068638, filed on Oct. 25, 2011.

(30) Foreign Application Priority Data

Oct. 29, 2010  (EP) .................................... 10189383

(51) Int. Cl.
*B01L 3/00*         (2006.01)
*F16K 99/00*        (2006.01)

(52) U.S. Cl.
CPC ..... *B01L 3/502723* (2013.01); *B01L 3/502738* (2013.01); *F16K 99/0017* (2013.01);
(Continued)

(58) Field of Classification Search
CPC ................ B01L 3/00; B01L 3/502723; B01L 3/502738; B01L 2200/0684; B01L 2200/12; B01L 3/5027; B01L 2400/0409; B01L 2300/0803; B01L 2400/0688; B01L 2400/0406; F16K 99/00; F16K 99/0017; F16K 99/0063; F16K 99/0001; F16K 2099/0084; G01N 21/07; B81B 1/00
USPC .......................................................... 422/506
See application file for complete search history.

(56) References Cited

U.S. PATENT DOCUMENTS 4,154,793 A    5/1979  Guigan
4,426,451 A    1/1984  Columbus
(Continued)

FOREIGN PATENT DOCUMENTS

EP    0626071 B1    2/1993
EP    1977829 A1    3/2007
(Continued)

OTHER PUBLICATIONS

International Search Report issued Feb. 13, 2012 pertaining to Application No. PCT/EP2011/068638, 3 pages.
(Continued)

*Primary Examiner* — Lore Jarrett
(74) *Attorney, Agent, or Firm* — Dinsmore & Shohl LLP

(57) ABSTRACT

A microfluidic element for analysis of a fluid sample having a substrate and a microfluidic transport system having a channel structure enclosed by the substrate and a covering layer. The channel structure comprises a channel with two side walls as well as a chamber that is in fluid communication with the channel. The chamber has a chamber wall with an inlet orifice. The channel comprises a channel section and a valve section adjoining the channel section, wherein the valve section is in fluid communication with the inlet orifice in the chamber wall in such a way that a fluid can flow from the channel through the valve section and into the chamber. The valve section has a fluid transport cross-section, which enlarges in flow direction. The fluid transport cross-section in the valve section is greater than the fluid transport cross-section in the preceding channel section.

36 Claims, 11 Drawing Sheets

(52) U.S. Cl.
CPC ..... *F16K99/0063* (2013.01); *B01L 2200/0684* (2013.01); *B01L 2200/12* (2013.01); *B01L 2300/0803* (2013.01); *B01L 2400/0406* (2013.01); *B01L 2400/0688* (2013.01); *F16K 2099/0084* (2013.01)

(56) References Cited

U.S. PATENT DOCUMENTS

| | | | |
|---|---|---|---|
| 5,061,381 | A | 10/1991 | Burd |
| 5,160,702 | A | 11/1992 | Kopf-Sill et al. |
| 6,143,248 | A | 11/2000 | Kellogg et al. |
| 6,395,553 | B1 | 5/2002 | Schembri |
| 6,919,058 | B2 | 7/2005 | Andersson et al. |
| 7,125,711 | B2 | 10/2006 | Pugia et al. |
| 8,486,333 | B2 | 7/2013 | Wang et al. |
| 2002/0036018 | A1 | 3/2002 | McNeely et al. |
| 2004/0206408 | A1 | 10/2004 | Peters et al. |
| 2005/0118070 | A1* | 6/2005 | Griss et al. .............. 422/100 |
| 2005/0133101 | A1 | 6/2005 | Chung et al. |
| 2005/0169778 | A1* | 8/2005 | Blankenstein et al. .... 417/410.1 |
| 2005/0196328 | A1* | 9/2005 | Fouillet et al. ............ 422/100 |
| 2006/0002817 | A1* | 1/2006 | Bohm et al. .............. 422/57 |
| 2007/0134799 | A1 | 6/2007 | Schembri |
| 2008/0254468 | A1* | 10/2008 | Glauser ............ B01L 3/502738 435/6.11 |
| 2009/0155925 | A1* | 6/2009 | Boehm ..................... 436/174 |

FOREIGN PATENT DOCUMENTS

| | | |
|---|---|---|
| WO | 9319827 A1 | 10/1993 |
| WO | 95/06870 A1 | 3/1995 |
| WO | 95/33986 A1 | 12/1995 |
| WO | 0146465 A3 | 6/2001 |
| WO | 2005/119211 A1 | 12/2005 |
| WO | 2007042219 A1 | 4/2007 |
| WO | 2007/116909 A1 | 10/2007 |
| WO | 2008119470 A1 | 10/2008 |

OTHER PUBLICATIONS

Madou Marc et al., "Lab on CD," Annual Review of Biomedical Engineering, 2006, pp. 601-628, retrieved from http://bioenc.annualreviews.org on Apr. 25, 2013.

Notice of Allowance dated Jul. 29, 2015 pertaining to U.S. Appl. No. 13/871,720.

* cited by examiner

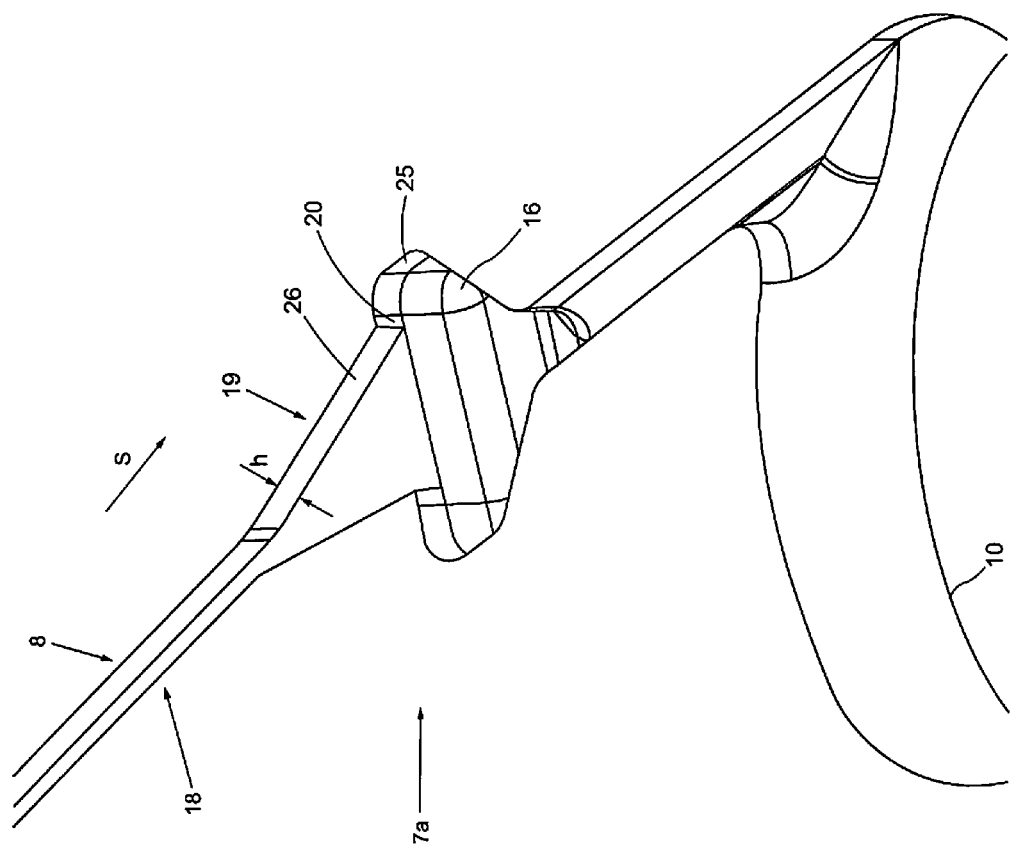

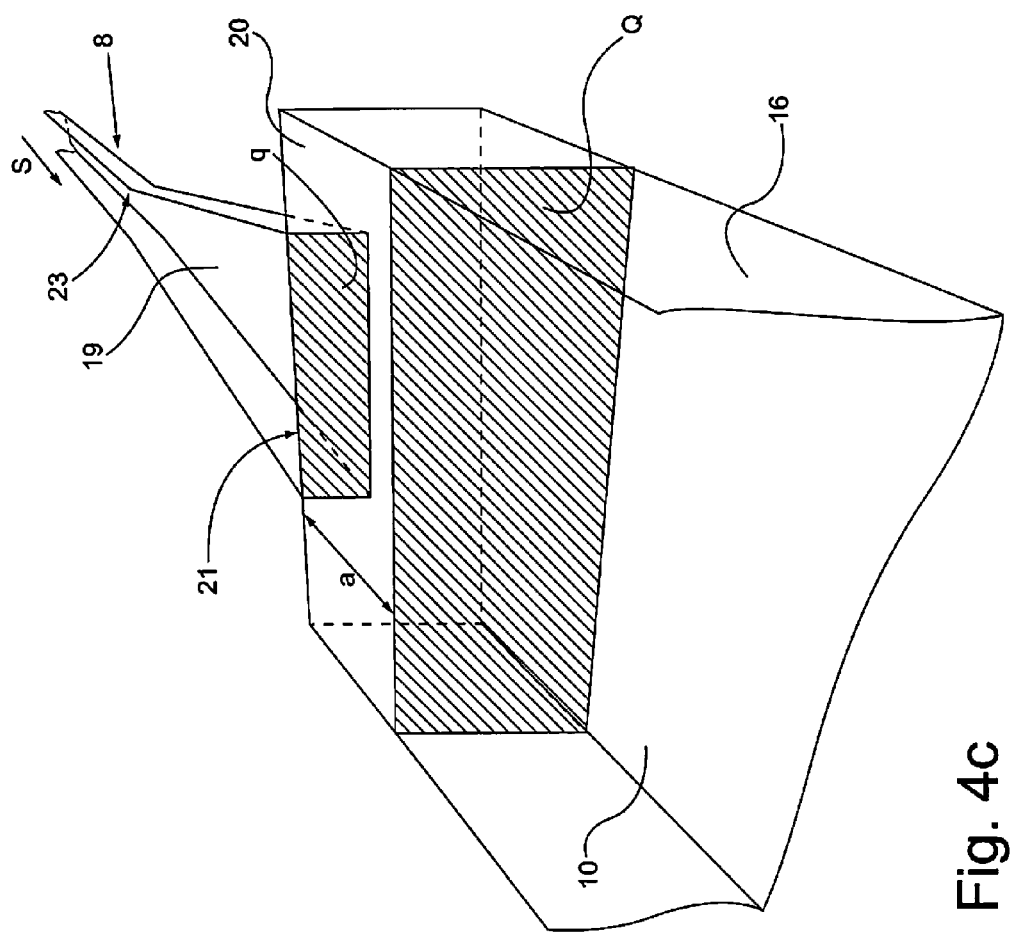

MICROFLUIDIC ELEMENT FOR ANALYSIS OF A SAMPLE LIQUID

CROSS-REFERENCE TO RELATED APPLICATIONS

This application is a continuation of International Patent Application No. PCT/EP2011/068638, filed 25 Oct. 2011, which claims the benefit of European Patent Application No. 10189383.2 filed 29 Oct. 2010, the disclosures of which are hereby incorporated herein by reference in their entirety.

BACKGROUND

The present disclosure relates to a microfluidic element for analysis of a liquid sample and, more particularly, a microfluidic element for analyzing a fluid sample, with a substrate and a microfluidic transport system having a channel structure enclosed by the substrate and a covering layer. The channel structure comprises a channel and a chamber in fluid communication with the channel. The fluid is transported through the channel into the chamber, whereby entry of the fluid into the chamber is carried out in a controlled manner.

Microfluidic elements or test carriers of this type are used, for example, for biochemical assays in which various parameters of the fluid are assayed in the chambers. Tests of this type are used in in-vitro diagnostic systems, for example for immunological assays. These immunological tests often require a multi-step reaction protocol, so that the test procedure is carried out in a plurality of sub-steps. As an example, the sample to be tested is initially placed in the sample chamber. There it will be brought into contact with immobilized receptor molecules, i.e., molecules that are locally fixed in the chamber, so that the molecules in the sample fluid that are complementary to the receptor molecules can react with them. These receptor molecules may be in the form of individual spots, but they may also be immobilized in a microarray. A microarray is advantageous when various sample parameters are to be tested in one chamber. After reacting the sample with the immobilized receptor molecules, which may be antibodies, for example, in a further step of the procedure, the sample chamber is washed with a washing fluid. In a next step, a labeling fluid is transported into the chamber or reagents are added so that detecting antibodies can reach the bound molecules. Labels of that type may, for example, be receptor antibodies with fluorescent tags. In a further step, washing of the chamber is again carried out using a washing fluid. This step is, for example, used for "bound/free separation", in order to separate free and unbound detecting antibodies, for example antibodies coupled with a fluorescent label. This washing process is frequently carried out several times in a row so that all of the free labeled antibodies can be removed. Only in this manner is it guaranteed that all free antibodies have been removed and only the bound antibodies are measured.

Due to the nature of the system and because of the lack of space it is often not possible with microfluidic elements to integrate a separate channel with a separate capillary stop into the test carrier or the microfluidic element for each step of the process. Thus, the channels and valves have to be used a plurality of times in succession. In order to control the fluid flow, geometric valves, for example, are used as a capillary stop. Fluid transport by capillary action is stopped by the abrupt change in cross-section when the small channel opens into the larger chamber. This transition thus forms a valve.

Valves and transitions that are known in the art, however, are designed to be used only once. For multiple use, they cannot be vented in a reliable and robust manner, and so controlled fluid transport cannot be reliably ensured. Particularly in the case of washing buffers, which comprise solutions containing detergents, a soap film often forms at the valve, so that venting of the valve and the channel is prevented by the soap film. Furthermore, due to the nature of the system, high capillary forces or adhesion often lead to fluid residues being left at the edges or corners of the channels. Thus, during capillary filling, for example of a siphon valve (S- or U-shaped channel between two chambers), fluid residues remain at its end which, when passing over into the next chamber, can flow into each other and thus air can no longer escape during subsequent filling. Filling with fluid stops and transfer of the fluid into the next chamber is thus no longer possible, since the principle of communicating channels (pipes) is no longer satisfied. This risk is particularly high with the microfluidic channels used, which comprise a siphon structure and are supposed to be used multiple times. In other valve types, residual fluid in the channels is less critical, since in that case, communicating channels are not required for the channel structure to function. The problem principally arises where channels have to be filled by capillary action.

Various approaches to a solution have been published in order to provide a valve that can be used multiple times. As an example, U.S. Pat. Appln. Pub. No. 2007/0134799 A1 and U.S. Pat. No. 6,395,553 B1 propose a microfluidic valve wherein a spring-loaded steel ball closes an outlet. A valve of that type, which is expensive and complicated to produce, is used in microfluidic test assays when a siphon-like structure cannot be employed for the channels. In order to transport the fluid, it is necessary for the valve at the chamber outlet to be opened. This is usually accomplished by generating a centrifugal force, and so the use of such a valve is limited to rotary test carriers.

As rotation begins, the ball inside the valve is forced radially outwardly and opens up the orifice so that the fluid can flow through the valve. When the speed is less than a pre-set rotational speed, the centrifugal force is reduced and the spring force of the spring acting on the ball predominates and the valve is closed. In addition to the spring force, in order to open the valve, the friction of the valve ball must also be overcome.

The forces required to control the fluid are frequently also produced in other capillary structures by centrifugal forces. However, other means for controlling fluids are known, as summarized, for example, in DE 10 2005 048 260 A1. One possibility for controlling the fluids in rotary test carriers is the use of a siphon channel between two chambers, wherein the desired fluid control is obtained by an appropriate arrangement of the inlet to the siphon channel and the outlet therefrom in the radial direction. Int. Pat. Appln. Pub. Nos. WO 95/33986 A1, WO 95/06870 A1, WO 93/19827 A1 and U.S. Pat. No. 5,160,702 B1, for example, also employ a concept of that type.

Despite the measures taken in the references cited above to improve microfluidic structures for the purposes of biochemical assays, problems arise again and again with venting the individual channels, in particular the siphon channels. These problems increase with multiple use of a channel by various fluids, in particular with siphon channels, which are relatively narrow and are in the region of below approximately 0.4 mm.

Thus, there is a need in the art for the provision of a microfluidic element with a microfluidic channel structure in which on the one hand, reliable control of fluids inside the channel structure is obtained even upon multiple use, and on the other hand venting is reliably carried out when in multiple use. In addition, such an element should be inexpensive to produce.

SUMMARY

It is against the above background that the present disclosure provides certain unobvious advantages and advancements over the prior art. In particular, the inventors have recognized a need for improvements in microfluidic elements for analysis of a liquid sample.

In accordance with one embodiment of the present disclosure, a microfluidic element for analyzing a fluid sample is provided, the microfluidic element comprising a substrate and a microfluidic transport system having a channel structure. The microfluidic transport system is enclosed by the substrate and a covering layer, wherein the channel structure comprises a channel with two side walls and a chamber which adjoins the channel, the channel comprises a channel section and a valve section adjoining the channel section, the two side walls run parallel to each other in the channel section, the chamber has a chamber wall with an inlet orifice, the inlet orifice in the chamber wall adjoins the valve section, so that a fluid can flow out of the channel through the valve section into the chamber, the valve section is provided with a fluid transport cross-section that enlarges in flow direction, wherein the fluid transport cross-section of the valve section is larger than the fluid transport cross-section in the preceding channel section, and the valve section and the chamber form a capillary stop constituting a geometric valve, such that a fluid flowing through the channel is stopped at the end of the valve section at the inlet orifice of the chamber.

These and other features and advantages of the embodiments of the present disclosure will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The present disclosure will be described more fully hereinafter with reference to the accompanying drawings, in which exemplary embodiments thereof are shown. The particular features shown therein may be deployed individually or in combination in order to provide typical embodiments of the disclosure. The embodiments described do not limit the disclosure as defined in their general form in the claims. The exemplary description is made for a rotary microfluidic element and a rotary test carrier. It is self-evident that the typical embodiments may also be employed with non-rotary test carriers.

The following detailed description of the embodiments of the present disclosure can be best understood when read in conjunction with the following drawings, where like structure is indicated with like reference numerals and in which:

FIGS. 4a, 4b and 4c each show a section of the channel structure with a channel and a valve section;

Figure 1:
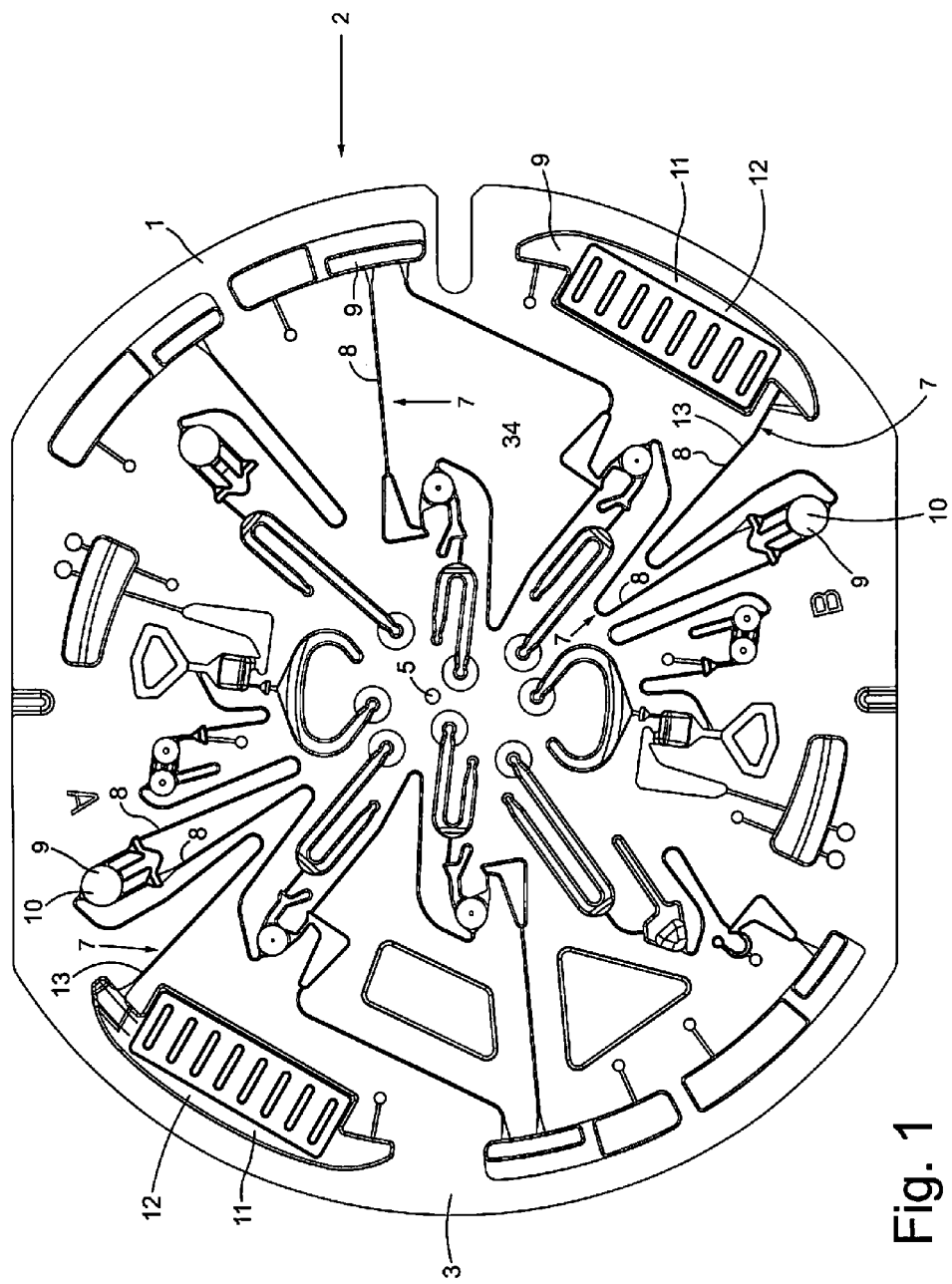
FIG. 1 shows a microfluidic element with a transport system.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present disclosure.

DETAILED DESCRIPTION

In accordance with an embodiment of the disclosure, the microfluidic element for the analysis of a fluid sample, in particular for carrying out multi-step biochemical analytical processes, comprises a substrate and a microfluidic transport system enclosed by the substrate and a covering layer. The transport system comprises at least one channel structure with a channel which has two side walls and with a chamber which is in fluid communication with the channel. The channel is provided with a channel section with side walls that run parallel and a valve section adjoining the channel section, which leads into the chamber of the channel structure. The chamber has a chamber wall with an inlet orifice at which the valve section ends, so that a fluid can flow out of the channel through the valve section and the inlet orifice into the chamber. The chamber thus directly adjoins the valve section. In accordance with an embodiment of the disclosure, the valve section has a fluid transport cross-section that enlarges in the direction of flow. This fluid transport cross-section is larger than the fluid transport cross-section in the preceding channel section. At the transition between the channel section and the valve, the cross-sections are typically the same. At the inlet orifice of the chamber, the cross-section of the valve section is larger than at the transition to the channel section. The term "fluid transport cross-section" should be understood to mean the cross-section of the channel of the channel structure that is perpendicular to the flow direction of the fluid to be transported. For a channel with a circular cross-section, the fluid transport cross-section is equal to the area of the channel spanned by the radius. For a rectangular channel, the fluid transport cross-section is given by the height and width spanned by the channel.

In accordance with an embodiment of the disclosure, the dimensions of the valve section and the chamber adjoining it are such that they form a geometric valve; i.e., the valve section and the adjoining chamber constitute a capillary stop. The capillary stop ensures that a fluid flowing through the channel is stopped at the end of the valve section at the inlet orifice of the chamber. The fluid does not enter the chamber in an uncontrolled manner since here, substantially smaller capillary forces prevail. The fluid only enters the chamber when the capillary stop is opened by (external) force acting on the fluid. So that the capillary stop functions reliably, further broadening has to be provided at the end of the valve section in the direction of fluid flow, so that further flow of a fluid moved by capillary action is prevented. As a consequence, the cross-section of the chamber must be significantly larger immediately behind the inlet orifice of the chamber than the cross-section at the end of the valve section, i.e., at the inlet orifice in the chamber wall. Thus, a cross-sectional area has to be formed in the chamber which is positioned parallel to the fluid transport cross-section in the valve section. It will be described as the "relevant chamber cross-sectional area" or the "relevant chamber cross-section".

The channel structure, which comprises the channel with the channel section and the valve section as well as the chamber, acts as a valve at the transition between the valve section and the chamber, i.e., directly at the inlet orifice in the chamber wall, which adjoins the valve section.

In order to provide the valve function at the transition between the valve section and the chamber wall, the channel structure typically broadens such that the relevant cross-section of the chamber close to the inlet orifice in the chamber wall to which the valve section adjoins is at least 1.5 times larger than the fluid transport cross-section in the valve section at the inlet orifice of the chamber wall. In a typical embodiment, the distance of the relevant cross-sectional area of the chamber from the inlet orifice in the chamber wall to which the valve section adjoins is 0.2 mm.

In a particularly typical embodiment, the relevant chamber cross-section at the predetermined distance to the inlet orifice is at least twice that of the fluid transport cross-section of the valve section at the inlet opening, particularly typically at least four times larger. In some embodiments, the relevant cross-section in the chamber is six times greater, ten times greater or even more times greater than the cross-section at the end of the valve section. In a further typical embodiment, the relevant cross-section at a perpendicular distance of 0.4 mm from the inlet orifice must be, e.g., at least three times greater than the fluid transport cross-section in the valve section.

A channel of this type with a fluid transport cross-section that enlarges in the valve section can have the advantage that fluid residues can be emptied out of the valve in such a manner that the channel can be reliably vented, thereby allowing multiple use of the channel. Particularly in the case of multi-step analytical processes, in which detergent-containing washing buffer solutions are used that have a tendency to form a soap film at the valve, enlarging the cross-sectional area towards the chamber means that closing of the capillary channel by soap film is avoided, ensuring effective venting even when the channel is filled multiple times. In principle, the formation of a soap film can be avoided when the cross-section of the capillary is substantially enlarged. However, a significant cross-sectional enlargement would result in the fact that the filling times of the siphon valve-shaped capillaries would be very long because of the small capillary force acting in such a large capillary. Furthermore, the channel would have a large "dead volume", since more fluid would remain in the channel. This, however, is counter to the desire for sample quantities that are as small as possible. Filling large capillaries also suffers from the disadvantage that air bubbles can readily build up in such channels.

In the context of the present disclosure, the technical implementation of the above channel structure and a broadening valve section at the transition to the next chamber can be used in order to substantially prevent residual fluid from being left behind at the end of the capillaries. In general, with channel structures in which two chambers are connected to one capillary channel, the problem arises that at the end of the capillary channels, in particular of siphon valve-shaped or siphon-shaped capillaries, residual fluids can be left behind. The residual fluid results from incomplete emptying or from fluid remaining stuck (by adhesion) on the capillary wall flowing together. When emptying, the pressure on the fluid column in the part of the siphon valve shaped capillary (siphon valve) which passes over into the next chamber decreases. If the ante-chamber (first chamber in the direction of flow) is empty and residual fluid is still in the siphon valve capillary adjoining the ante-chamber, a critical point is reached. In an ideal case, the fluid residue is emptied completely into the next chamber. This is not always the case, however, with known microfluidic elements.

The quality of emptying of the residue at a given pressure is dependent on the shape of the transition of the channel into the next chamber. If edges and sites with abrupt surface broadenings exist, as is the case with a normal siphon valve transition to the downstream chamber, a certain amount of energy is necessary for the fluid to pass this transition site (step position). This is not critical typically as long as there is still sufficient fluid in the ante-chamber. If the pressure towards the end of emptying decreases, then the fluid column at the transition can become unstable and breaks up in a manner more or less reproducible. This residual fluid is then held in the siphon valve under capillary action and is difficult to remove, since the reduced "mini" fluid column can only build up a very small pressure. Fresh filling of the siphon valve is not possible because of the lack of opportunity for venting. Because of the inventive broadening of the channel, however, no residual fluid remains in the channel, in particular not in the broadened valve section. Abrupt spatial transitions are avoided. Of course, in the inventive embodiment there is a significant broadening from the valve section into the chamber. However, this transition to the chamber is optimized by the broadened valve section (partially with the aid of additional elements such as a ramp) such that the transition is less like a step and residual emptying of the capillary channel is thus possible.

This inventive capillary channel with a broadened valve section, in accordance with various embodiments of the disclosure, thus eliminates the problems of the art and effectively prevents the formation or stabilization of soap film and prevents residual fluid from remaining in the capillary and thereby preventing the capillary channel from closing. In addition, the capillary channel can optionally be shaped so that on the one hand edges and parts with abrupt surface broadenings are avoided (for example by rounding) and optionally, the capillary is positioned in the vicinity of a downstream chamber wall. As a result, in the capillary structure of the embodiments of the present disclosure, dual broadening occurs. Initially, the channel is widened in the valve section in the direction of fluid flow. The second broadening occurs at the transition of the channel into the adjoining chamber, namely precisely when the valve section meets the channel wall. The chamber itself is thus further broadened compared with the upstream valve section. The broadening in the valve section ensures that the capillary channel is completely emptied. The second broadening at the transition into the channel ensures that the desired valve function is carried out in the channel structure at the end of the valve section. The fluid will only flow into the chamber when an external force, for example a rotational force, overcomes the geometric valve.

The inventive configuration of the valve section, in accordance with embodiments of the present disclosure, has the additional advantage that the whole channel structure can still be produced using known injection molding techniques. No additional external elements have to be used, which on the one hand means that the material costs are kept low and on the other hand that the production costs of the process are reasonable. Compared with the known spring-loaded valves with a closing ball, the simple geometric configuration provides for a major production cost advantage.

In a typical embodiment, the fluid transport cross-section may be broadened by not having the side walls in the valve section running parallel, but having them broadening towards the inlet orifice of the chamber. The distance between the valve section side walls at the inlet orifice of the chamber is thus larger than their distance at the transition of the valve section and the channel section. Typically, the valve section broadens out continuously in the direction of flow of the fluid; thus, the broadening is continuous. The cross-section enlarges steadily. The valve section does not have any regions with a constant width or constant cross-sectional area. In principle, a stepped broadening is possible, as long as the stepped changes in cross-section are not so large that such a change acts as a capillary stop. In any case, the fluid transport cross-sectional area typically must not be reduced in the valve section.

In a typical embodiment, the valve section may have a constant height. The broadening of the fluid transport cross-section is then realized exclusively by increasing the distance between the side walls. Alternatively, or in addition, the enlargement of the fluid transport cross-section can be realized by increasing the height, whereby the height in the valve section is increased towards the inlet orifice of the chamber.

In the context of the present disclosure, it should be known that typically, the distance between the valve section side walls at the inlet orifice of the chamber is at least twice that of the distance between the valve section side walls at the transition to the channel section. Typically, the distance between the side walls at the inlet orifice is at least three times greater, particularly typically at least four times greater than the distance between the side walls at the channel section. Alternatively or in addition, the height can change in the same proportions.

Since in comparison with the valve section, the chamber has a substantially greater width and height, the valve section acts efficiently as a capillary stop, so that fluid flowing under capillary action is stopped at the inlet orifice of the chamber. The height of the chamber is typically at least double that of the height of the channel. As long as only capillary forces act on a fluid flowing in the channel, the channel section and the valve section of the capillary channel fill up with fluid. The fluid is stationary in the channel and does not flow automatically into the adjoining chamber. The fluid is only allowed to flow into the chamber by the additional action of a force. A suitable (external) force can, for example, be produced by an external pump, or it may be a centrifugal force, which is produced by rotating the microfluidic element. The breakthrough frequency of the valve section is set by an appropriate geometry for the valve section and rotation of the fluid elements. The breakthrough frequency is the frequency at which the capillary stop no longer holds the fluid back, but opens the valve. As soon as the breakthrough frequency is exceeded, the capillary channel empties. Fluid flows out of the channel into the chamber. For non-rotary systems, the external force has to be set appropriately.

The broadening of the valve section to the inlet orifice of the chamber ensures that even the last fluid residue flows out of the channel. Typically, the outflow of the fluid residue is supported by positioning the inlet orifice in the chamber wall close to a chamber side wall. The valve section is typically positioned in such a way that one of the valve section side walls meets the chamber wall near the chamber side wall. Exit of the residual fluid from the channel is supported, since the side wall draws in the residual fluid by adhesive forces or draws residual fluid that has already flowed along the side wall by cohesive forces into the chamber. A soap film built up in the valve section is also "drawn" by the adjacent side wall so that the soap film cannot be stabilized and thus spreads out, so that it is destroyed. The distance from the valve section side wall to the chamber side wall is advantageously at most double the width of the channel section. Typically, the distance is at most equal to the width of the channel section, and highly typically at least half the width or a quarter the width of the channel section.

In an alternative typical embodiment of the microfluidic element, in the valve section between the two valve section side walls, a rib is positioned such that two adjacently positioned valve section sub-channels are formed. Typically, the sub-channels have different sizes. The rib is typically constructed such that the fluid transport cross-sections of the two sub-channels in the region of the inlet orifice into the chamber are in total greater than the fluid transport cross-section in the channel section. In a particular embodiment, the fluid transport cross-sections of the two sub-channels are in total at least twice that of the fluid transport cross-section in the channel section. As an example, the cross-section of each sub-channel may be as large as the cross-section of the channel section. Optionally, the width of one of the two valve section sub-channels is equal to the width of the channel in the channel section. Typically, in addition, at least one of the two sub-channels broadens towards the chamber. Typically, the rib is formed by a sub-part of the substrate of the microfluidic element, the sub-part enlarging towards the chamber.

The two valve section sub-channels each end at the chamber wall of the chamber. The distance between the first valve section sub-channel and the second valve section sub-channel at the chamber wall is at least twice that of the width of the narrower valve section sub-channel. Typically, the distance between the two valve section sub-channels at the chamber wall is at least four times, particularly typically at least six times the width of the narrower valve section sub-channel. In particular embodiments of the microfluidic element, the distance between the two valve section sub-channels is at least eight times or ten times that of the width of the narrower valve section sub-channel.

The construction of the valve section with two valve section sub-channels and a rib positioned there between results in both valve section sub-channels together with the chamber forming a respective capillary stop. The valve section sub-channels and the chamber are thus each constructed as a geometric valve. By using appropriate dimensions for the chamber, the valve function is produced so that at the respective transitions from the valve section sub-channel to the chamber, the fluid is stopped and the valve function is carried out.

Typically, the two sub-channels enclose an angle of at least 40 degrees with respect to each other. It can be advantageous for the angle between the two sub-channels to be at least 50 degrees, particularly typically at least 60 degrees. Under fluid flow conditions, it can be advantageous for the valve section sub-channel to be essentially aligned with the channel section. This sub-channel is termed the main sub-channel. Its width typically essentially corresponds to the width of the channel section of the channel. The second sub-channel broadens in the direction of flow.

Typically, the two sub-channels enclose an angle of at least 40 degrees with respect to each other. It can be advantageous for the angle between the two sub-channels to be at least 50 degrees, particularly typically at least 60 degrees. Under fluid flow conditions, it can be advantageous for the valve section sub-channel to be essentially aligned with the channel section. This sub-channel is termed the main sub-channel. Its width typically essentially corresponds to the width of the channel section of the channel. The second sub-channel broadens in the direction of flow.

FIG. 1 shows an embodiment of a microfluidic element 1 for in-vitro diagnosis, having a transport system 2. The transport system 2 is enclosed by a substrate 34 of the microfluidic element 1 and a covering layer, not shown. The substrate 34 consists, for example, of a plastic material such as COC (cyclo-olefin copolymer), PMMA (polymethyl methacrylate), polycarbonate or polystyrene. In the example shown, the microfluidic element 1 is constructed as a rotary test carrier 3, for example in the form of a rotatable disc.

Figure 2:
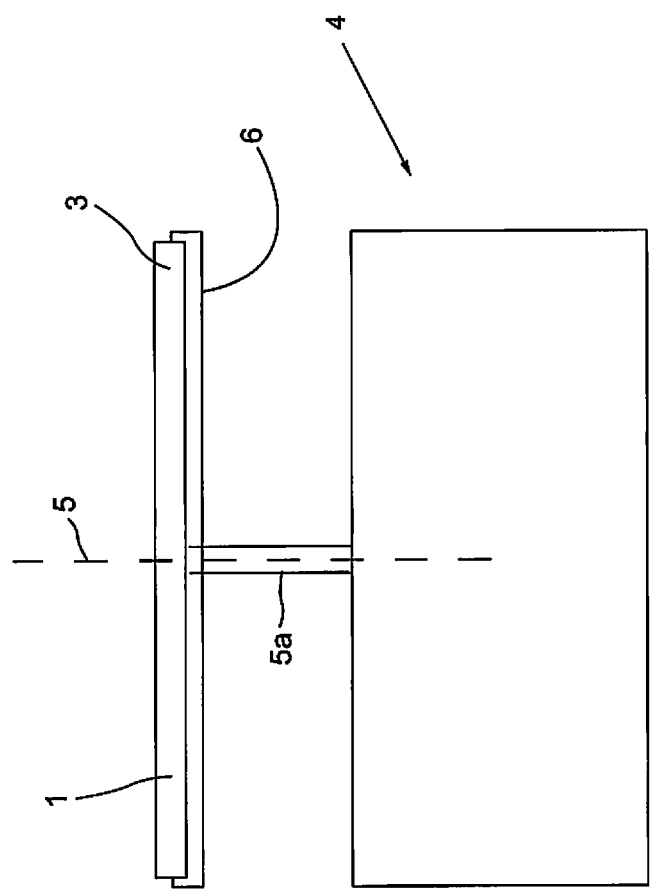
FIG. 2 shows an outline sketch of a centrifugal device with a test carrier.

The test carrier 3 is held, for example, in a centrifugal device 4 as shown in FIG. 2 and rotated about a rotational axis 5. The centrifugal device 4 is provided with a holder 6 that holds the test carrier and that is positioned at the end of a rotatably mounted rotational shaft 5a. The rotational shaft 5a is positioned concentrically with the rotational axis 5. In the embodiment shown here, the rotational axis 5 extends through the center point of the test carrier 3. Clearly, other embodiments of the microfluidic element 1 are possible, wherein the rotational axis does not extend through the center point of the element 1 or does not extend through the element 1.

Constructing the microfluidic element 1 as a rotary test carrier 3 is one possible embodiment whereby an external force can be produced to control a fluid in the transport system 2. Instead of the centrifugal force, externally produced pressure forces may be employed, for example.

The microfluidic element 1 shown here is used for i.e., blood tests. In this respect, a plurality of process steps is carried out in succession, wherein parts or regions of the transport system 2 are used several times during the course of the process. Drying the channels of the transport system 2 between the steps of the process is not possible, so that the microfluidic element 1 and the transport system 2 contained therein must ensure that even when individual channels of the transport system 2 are filled several times, a secure process procedure is possible, and in particular no unwanted air bubbles arise because residual fluid has been left behind.

The transport system 2 comprises a plurality of channel structures 7 that respectively comprise a channel 8 and a chamber 9. One of the channel structures 7, which is used multiple times, comprises a chamber 11 formed as a waste chamber 12 and a channel 13, which extends between a measuring chamber 10 to test the sample fluid and the waste chamber 12. The waste chamber 12 acts as a waste reservoir for surplus fluid or fluid that is no longer required.

Figure 3:
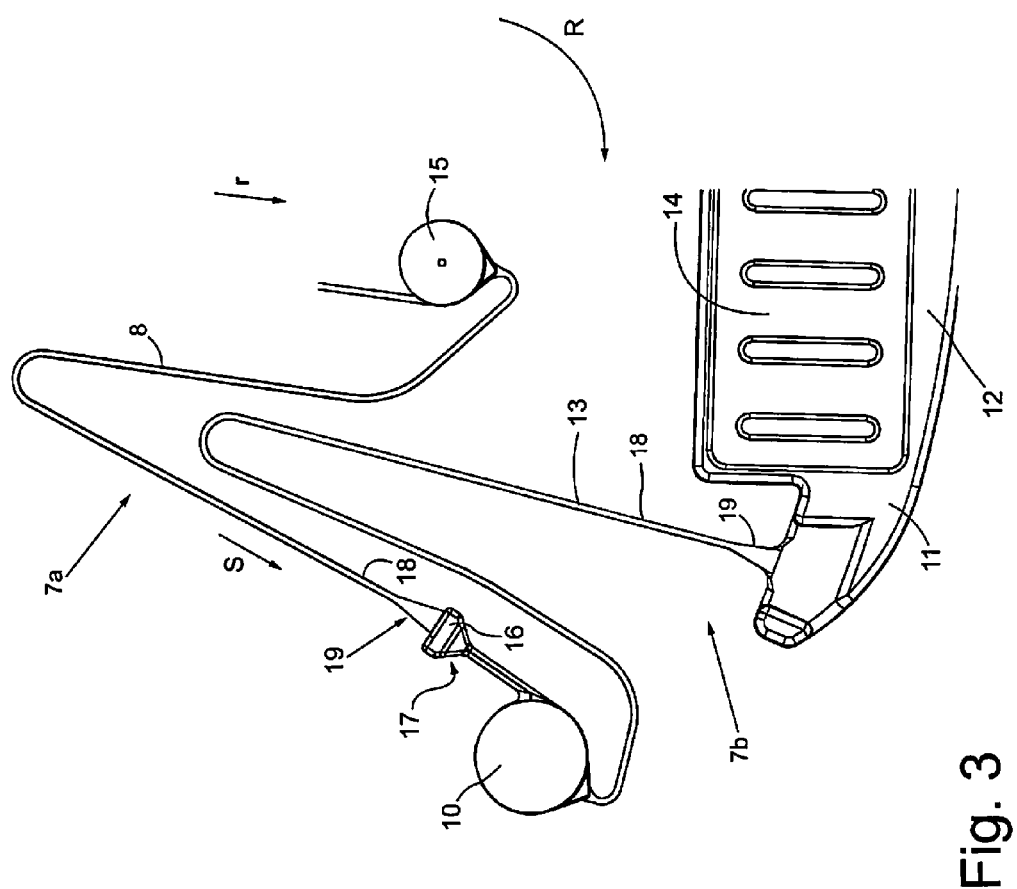
FIG. 3 shows a section of the transport system of FIG. 1 with a channel structure.
Figure 4A:
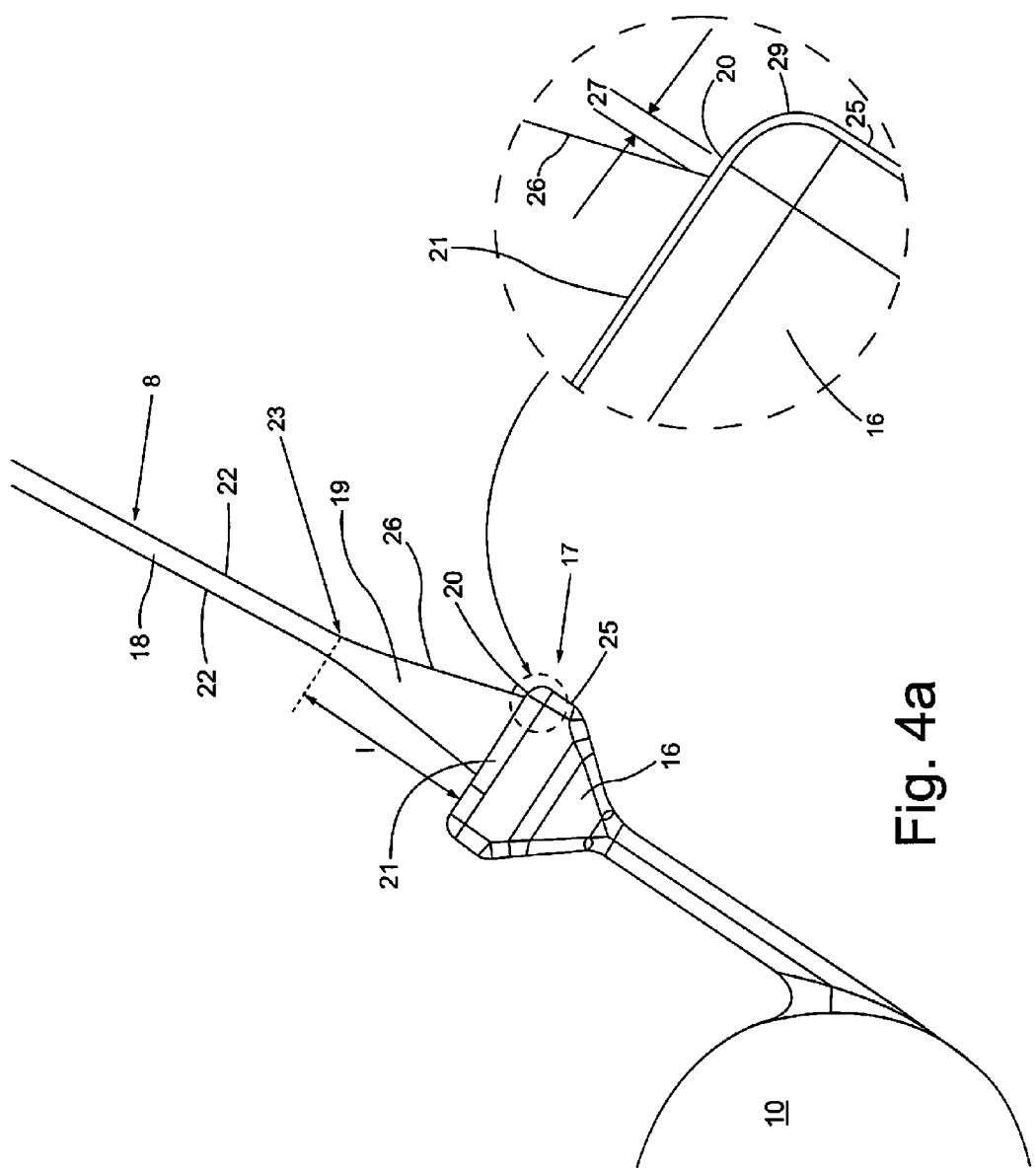

FIG. 3 shows a section of the transport system 2 of FIG. 1 with two channel structures 7a, 7b; FIGS. 4a to 4c show a section with the channel structure 7a. The embodiments described here are not limited to rotary test carriers, but may be used in any test carrier with transport systems in which microfluidic channels are filled multiple times. The channel structure 7a comprises a collecting chamber 15 and a measuring chamber 10 as well as a fluid channel 8 positioned between the collecting chamber 15 and the measuring chamber 10 and having the shape of a siphon. Such a channel is termed a siphon valve. The channel structure 7b includes the measuring chamber 10, the siphon-shaped channel 13 as well as the waste chamber 12; only part of it is shown. In a particular embodiment, it contains a mat of fibers 14 that sucks up the fluid flowing into the chamber. The reactions required to analyze a sample fluid take place in the measuring chamber 10. It may, for example, include microarrays with immobilized antibodies. For simplicity, venting orifices, for example in the chambers, are not shown.

A channel structure 7, 7a, 7b thus always includes a first chamber and a second chamber as well as a channel (capillary channel) connecting the chambers. Typically, the channel of a channel structure of this type is siphon-like in shape, a so-called siphon valve. In the channel structure 7a, the first chamber is the collecting chamber 15, while the second chamber is an intermediate valve chamber 16. In the channel structure 7b, the first chamber is the measuring chamber 10 and the second chamber is the waste chamber 12.

FIGS. 4a, 4b show detailed views of the intermediate valve chamber 16 and the channel 8, wherein FIG. 4b shows an isometric view. The channel 8 and the intermediate valve chamber 16 constitute a geometric valve that forms a capillary stop 17, so that fluid transported in the channel 8 by capillary action comes to a standstill upstream of the intermediate valve chamber 16. Thus, the channel 8 is filled by the capillary force exerted in the direction of flow (arrow S).

When the fluid element 1 is rotated in the direction of the arrow R, a fluid is forced radially outwardly, in the present case in the direction of the arrow r. As soon as the rotational frequency exceeds the breakthrough frequency, i.e., the microfluidic element 1 is rotated fast enough, the capillary stop 17 opens and fluid can flow out of the channel 8 into the measuring chamber 10. The intermediate valve chamber 16 is provided with a chamber wall 20 having an inlet orifice 21, through which fluid flows out of the channel 8 into the intermediate valve chamber 16.

The channel 8 comprises a channel section 18 and a valve section 19 adjoining it in the direction of flow. In accordance with the present disclosure, the valve section 19 has a fluid transport cross-section that increases in flow direction. The fluid transport cross-section of the valve section 19 is larger at the inlet orifice 2 than the fluid transport cross-section at the transition from the channel section 18 to the valve section 19.

The side walls 22 of the channel 8 typically run parallel to each other in the channel section 18. In the valve section 19, the side walls (valve section side walls 26) are typically not parallel, so that the width of the channel broadens. The height h in the valve section 19 is constant so that overall, the height of the channel 8 is constant. The term "height" here means the dimension normal to the plane of the surface of the microfluidic element 1.

In the embodiment shown here, the width of the valve section 19 at the inlet orifice 21 (distance between the side walls 22) is three times higher than the width of the channel 8 at the transition 23 from the channel section 18 to the valve section 19.

In the context of the present disclosure, the length l of the valve section 19 is typically at least three times greater than the distance between the side walls 22 at the channel section 18, typically three times greater than the distance between the side walls 22 at the transition 23 from the channel section 18 to the valve section 19. Particularly typically, the length l of the valve section 19 is at least five times the distance between the side walls 22 at the transition 23. A length that is seven times the distance between the side walls 22 can provide the valve section with particularly good properties.

According to FIGS. 4a and 4c, the intermediate valve chamber 16 adjoins the valve section 19. Through this, the cross-section of the channel structure broadens again, since the relevant cross-sectional area Q of the intermediate valve chamber 16 is substantially greater than the fluid transport cross-sectional area q at the end of the valve section 19 at the inlet orifice 21.

FIG. 4c shows a diagrammatic representation of the valve section 19 of the channel 8 and the adjoining intermediate valve chamber 16. The broadening of the valve section 19 in flow direction, s, and the fluid transport cross-section q at the inlet orifice 21 of the chamber wall 20 can clearly be seen. The relevant chamber cross-sectional area Q used to characterize the second broadening from the valve section 19 to the chamber 16 can clearly be seen at a distance "a" from the chamber wall. A distance of 0.2 mm from the inlet orifice can be an appropriate measurement for setting the relevant chamber cross-section. Typically, the distance from the relevant chamber cross-section to the chamber wall is measured perpendicular to the chamber wall. The relevant cross-sectional area of the chamber is taken to be parallel to the surface of the fluid transport cross-section.

In the present example, the length l of the valve section 19 equals 1.4 mm, and the width at the transition 23 between the valve section 19 and channel section 18 equals 0.2 mm. The width of the valve section 19 at the inlet orifice 21 is 0.74 mm. The height of the valve section is constant, at 0.15 mm. The intermediate valve chamber 16 at a distance of 0.2 mm from the inlet orifice 21, corresponding to the end of the valve section, has a width of 1.6 mm and a height of 0.5 mm. This corresponds to a relevant chamber cross-sectional area Q of 0.8 mm$^2$. Comparing the fluid transport cross-section q at the inlet orifice 21 with the relevant chamber cross-sectional area Q gives an enlargement factor of 6.7. These dimensions ensure that both the desired emptying of the channel 8 and the desired valve function at the end of the valve section 19 are carried out.

The valve function is thus also carried out when the height and/or width of the chamber (here the intermediate valve chamber 16) is greater than the height or width of the valve section 19 at the inlet orifice 21. Selecting suitable dimensions for the chamber and the valve section ensures that the chamber cross-section formed from the depth and width near the inlet orifice is at least 1.5 times greater than the fluid transport cross-section at the end of the valve section 19.

Alternatively, in order to carry out the functions of the channel structure 7, the dimensional criteria employed may also be the sizing of the chamber wall 20, in which the inlet orifice 21 is positioned. The area of the chamber wall 20 should typically be at least 1.5 times greater or at least double that of the area of the inlet orifice 21. In order to obtain this type of dimensioning, the width and/or the height of the chamber wall 20 typically must be correspondingly larger than the width and/or height of the inlet orifice 21. With a valve section 19 the length of which is at most ten times the distance between the side walls 22 at the transition 23, the channel 8 and the collecting chamber 15 are efficiently emptied, without a fluid residue being left in the channel structure 7a. When using a washing buffer solution, a build-up of soap film at the outlet from the valve section 19 is reliably prevented, so that the channel 8 can be ventilated.

Complete emptying of the channel 8 including the valve section 19 and the channel section 18 is thus typically further improved by positioning the valve section 19 asymmetrically on the chamber wall 20 of the intermediate valve chamber 16. One of the side walls 22 is positioned nearer to a chamber side wall 25 adjoining the chamber wall 20. The chamber side wall 25 typically encloses an angle of at least 80 to 170 degrees with respect to the chamber wall; in this embodiment, it is 90 degrees. Typically, one of the valve section side walls 26 is positioned in the vicinity of the chamber side wall 25 such that the distance 27 between it and the chamber side wall 25 is at most equal to the width of the channel section 18, typically equal to the distance between the side walls 22 at the transition 23. In the context of the present disclosure, positioning one of the valve section side walls 26 as close as possible to the chamber side wall 25 can be advantageous as regards to residue emptying. As an example, the distance 27 is at most half the width of the channel 8 at the transition 23, typically at most one third of this width.

Typically, the distance 27 is measured between the valve section side wall 26 and the chamber side wall 25 to the rounding 29 of the chamber wall 20. This distance 27 should typically be a maximum of one third of the width of the channel 8 at the transition 23. For a channel width of 0.2 mm, this gives a maximum extent of 0.06 mm for the distance 27.

By selecting the appropriate direction of rotation (arrow R), it can be ensured by means of Coriolis forces arising during rotation and Euler's forces arising during acceleration, which latter act in the opposite direction to that of rotation, the fluid sample is pressed against its nearest wall 25 when being transported from the valve section 19 to the chamber 16. In particular, this fact causes complete emptying of residue from valve 19 and guarantees that the channel 18 can be filled up again.

Figure 5:
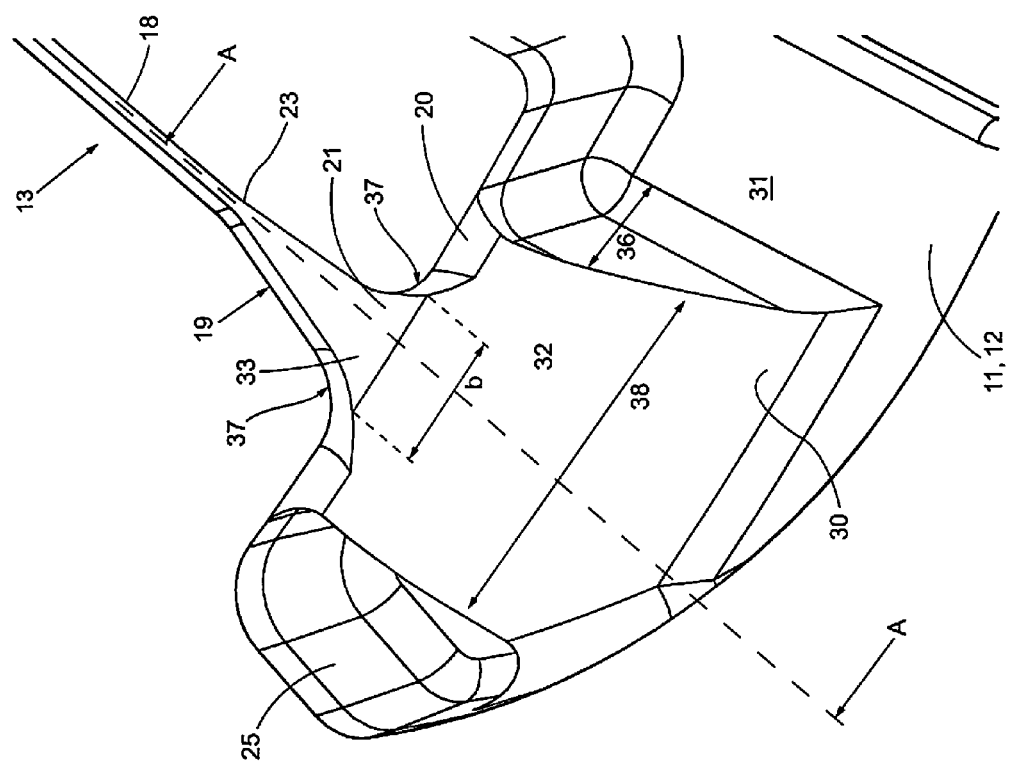
FIG. 5 shows a further section of the channel structure with a channel and a chamber.
Figure 6:
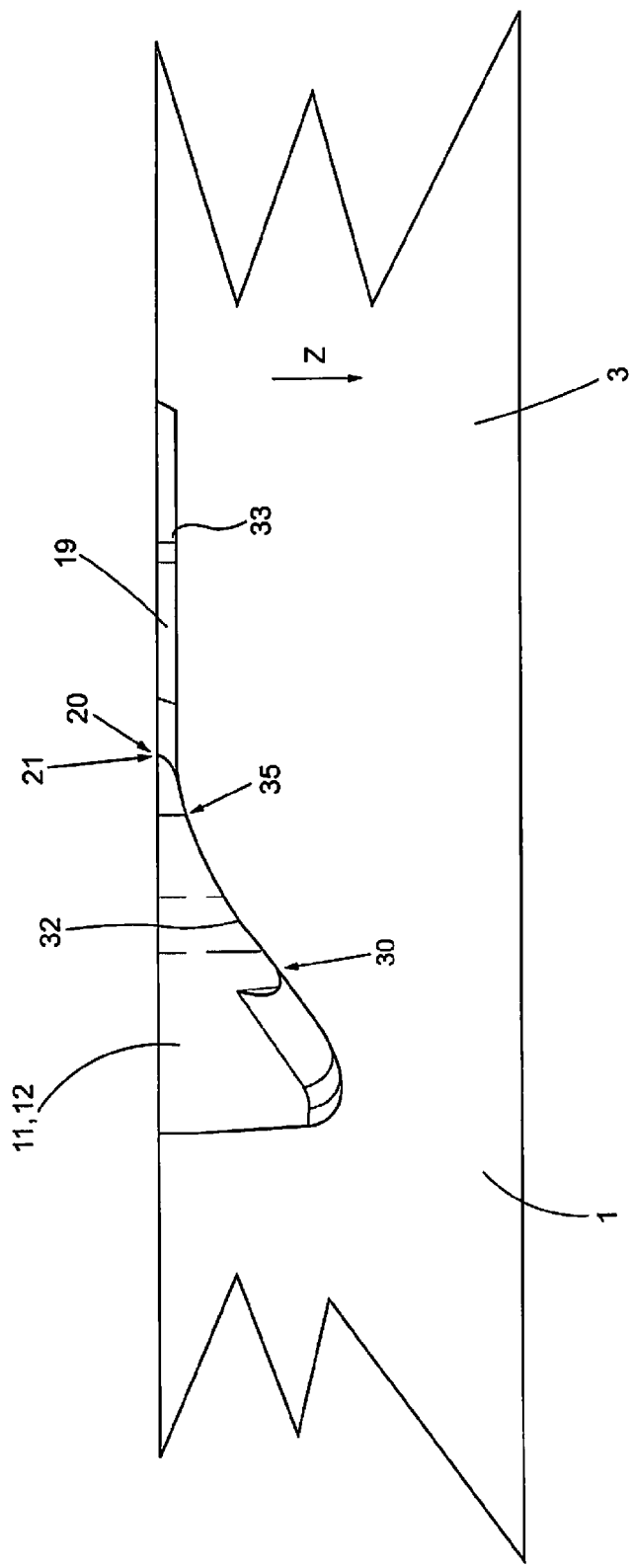
FIG. 6 shows a cross-section through the section of channel structure of FIG. 5.

The channel structure 7b from FIG. 3, which comprises the channel 13 and the waste chamber 12 with a ventilation orifice (not shown), is also constructed as a siphon structure and acts as a siphon valve for controlling the fluid transport. FIGS. 5 and 6 show a part of the channel 13 in detail with the channel section 18 and the valve section 19. The trumpet-shaped valve section 19 broadens in flow direction. Its fluid transport cross-section is larger at the inlet orifice 21 in the chamber wall 20 than at the transition 23. In this embodiment, the valve section 19 is not positioned at a chamber side wall 25 of the waste chamber 12. In order to ensure complete emptying of the channel 13, in this case the waste chamber 12 comprises a ramp 30, which is positioned at the floor 31 of the waste chamber 12 and extends away from the inlet orifice 21 at the chamber wall 20. In this regard, the height 36 of the ramp 30 decreases with increasing distance from the chamber wall 20. The top side 32 of the ramp 30 closely is flush with the floor 33 of the valve section so that a continuous transition is formed, as shown in FIG. 5 and the section along A-A in FIG. 5 shown in FIG. 6. The ramp 30 is also produced in the substrate 34 of the microfluidic element 1 or test carrier 3 using injection molding techniques. Thus, producing it does not incur any further costs.

For the chamber 11 formed as a waste chamber 12 as well, it can be advantageous for the relevant chamber cross-section Q at a distance of 0.2 mm from the inlet orifice 21 to be 1.5 times larger than the fluid transport cross-section q at the inlet orifice 21. Tests on the present embodiment show that despite the configuration with the ramp 30 in the chamber 12, this criterion is satisfied, even when the ramp 30 constitutes a continuous transition to the floor of the valve section 19. At a distance of 0.4 mm from the inlet orifice 21, the ratio of the relevant chamber cross-section Q to the fluid transport cross-section q at the inlet orifice is significantly larger; in the present case, it is 36 times larger. This shows that the desired function of residue-free emptying of the channel 8 and the valve function at the inlet orifice 21 are reliably accomplished.

Because of the continuous transition of the floor from the valve section 19 via the ramp 30 into the waste chamber 12, emptying of the valve section 19 and the channel 8 is improved even further, as is positioning the valve section 19 close to one chamber side wall 25 in the preceding embodiment described with respect to FIGS. 4a, 4b.

Typically, the ramp 30 is constructed such that its top side 32 is flat. Alternatively, it may be curved. The "tangential" transition (rounding 35) formed by the floor 33 of the valve section 19 and the top side 32 of the ramp 30 is typically rounded with a rounding radius in the Z-direction (see FIG. 6) which is typically in the range of 1.25 mm to 2.25 mm. In the present example, the radius of the rounding 35 is 1.75 mm.

In a typical embodiment, the valve section 19 is constructed such that the valve section side walls 26 run straight, at least in parts. At the end of the valve section 19 towards the inlet orifice 21, practical tests can demonstrate that a rounding 37 in the transition to the chamber wall 20 can be advantageous. The rounding 37 in the X-Y direction typically has a rounding radius in the range of 0.5 mm to 1 mm; in the particular embodiment shown, it is 0.65 mm.

The width 38 of a ramp 30 can be larger than the width b of the inlet orifice 21. Typically, the ramp is at least 10% to 50% wider than the inlet orifice 21; particularly typically, it is twice the width. In the context of the present disclosure, a ramp 30 with a width 38 that is three times the width b of the inlet orifice 21 can be advantageous. In accordance with one embodiment of the disclosure, the width of the ramp 30 should be at most five times larger than the width b of the inlet orifice 21 (without rounding 37). Since the ramp 30 overlaps the inlet orifice 21 laterally, a lateral rounding of the ramp is not necessary. It can be advantageous for the sides of the ramp 30 to form an abrupt transition to the chamber floor 31 of the waste chamber 12. In this manner, reflux of fluid out of the waste chamber into the valve section 19 is prevented.

Using the ramp 30 in the waste chamber 12 also means that soap film build-up in the valve section 19 is "drawn into the chamber" so that the soap film is destroyed. Fluid residues from the channel 13 are guided away via the ramp 30 by cohesive forces.

Figure 7:
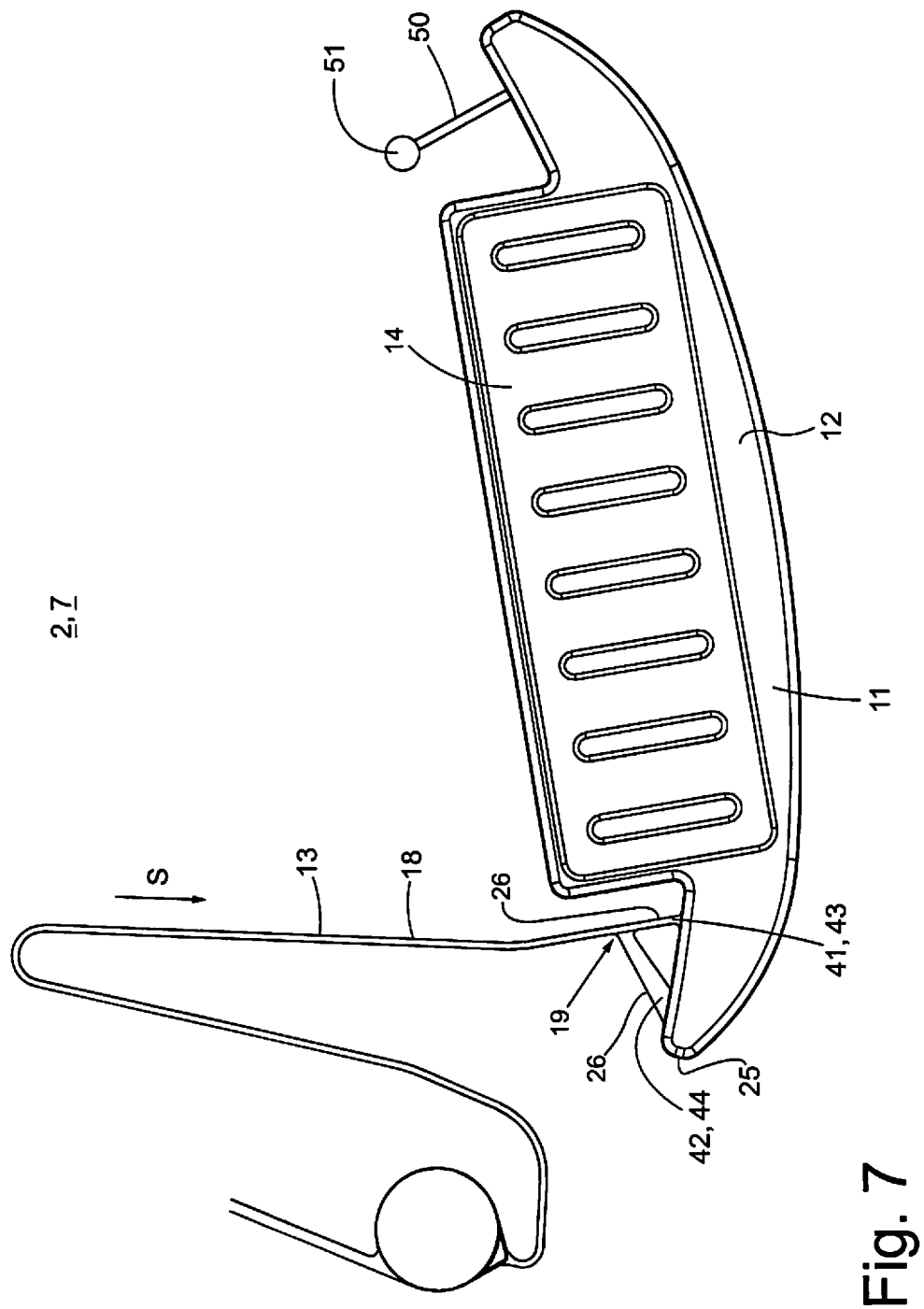
FIG. 7 shows an alternative embodiment of a channel structure with a valve section.

FIG. 7 shows a section view through the transport system 2 of the microfluidic element 1 with an alternative inventive channel structure 7. It comprises a channel 13 and a waste chamber 12 with an optional mat of fibers 14. The waste chamber 12 has a venting channel 50 at its end with a venting orifice 51, through which air can escape from the waste chamber 12 and the channel structure 7. The channel 13 comprises a channel section 18 and an adjoining valve section 19, which forms a capillary stop with the waste chamber 12. Fluid can only flow into the waste chamber 12 when the capillary stop has been broken through.

Between the two valve section side walls 26, the valve section 19 typically comprises a rib 40 such that two adjacently positioned valve section sub-channels 41, 42 are formed. In this sub-section 42 of the valve section 19 as well, the fluid transport cross-section broadens in the direction of flow S, see FIGS. 7, 8.

Typically, the first valve section sub-channel 41 forms a main sub-channel 43 and the second valve section sub-channel 42 forms a bypass sub-channel 44. The two sub-channels 41, 42 in this case include an angle of 65 degrees.

Figure 8:
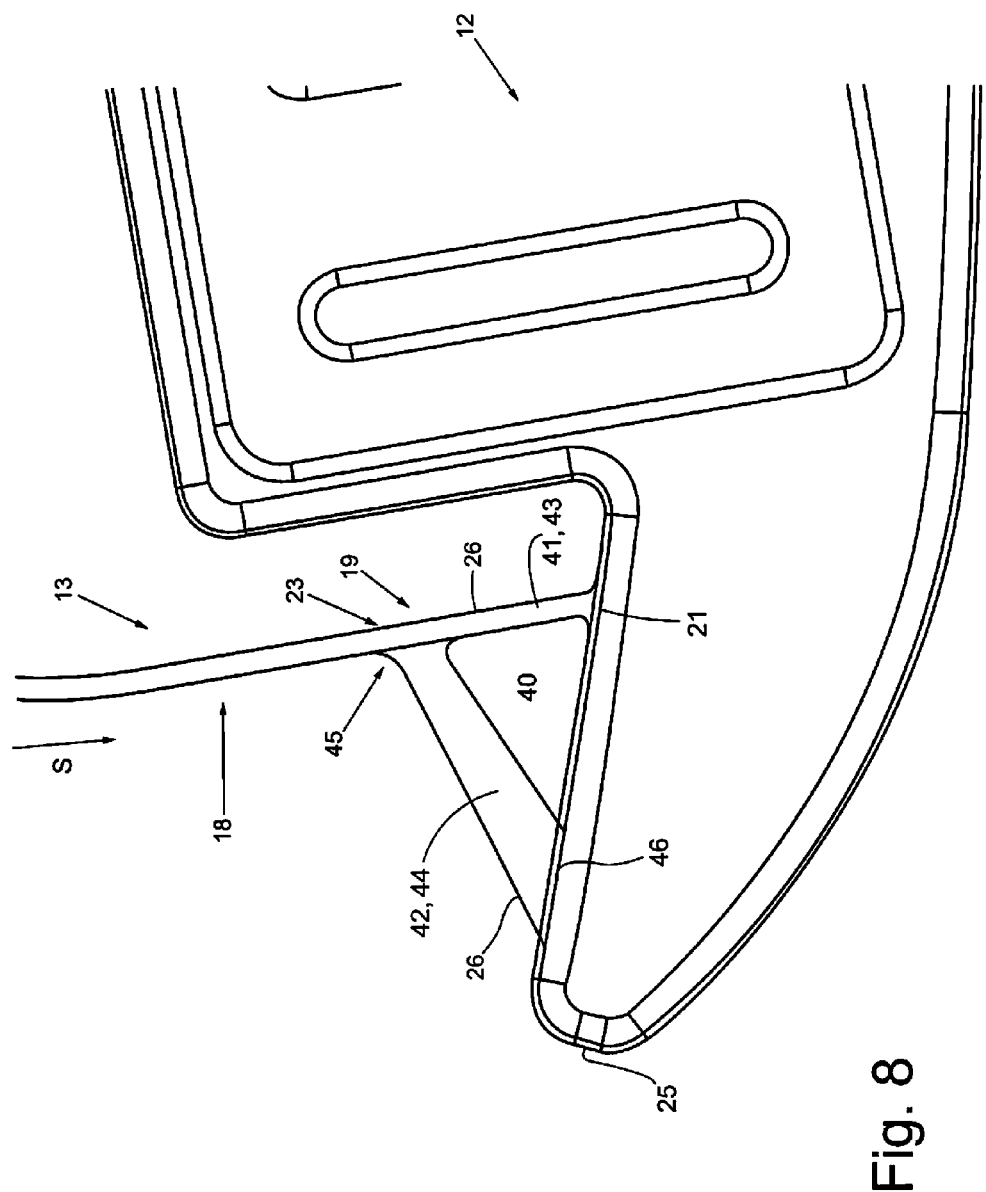
FIG. 8 shows a detailed view of the valve section of FIG. 7.
Figure 9:
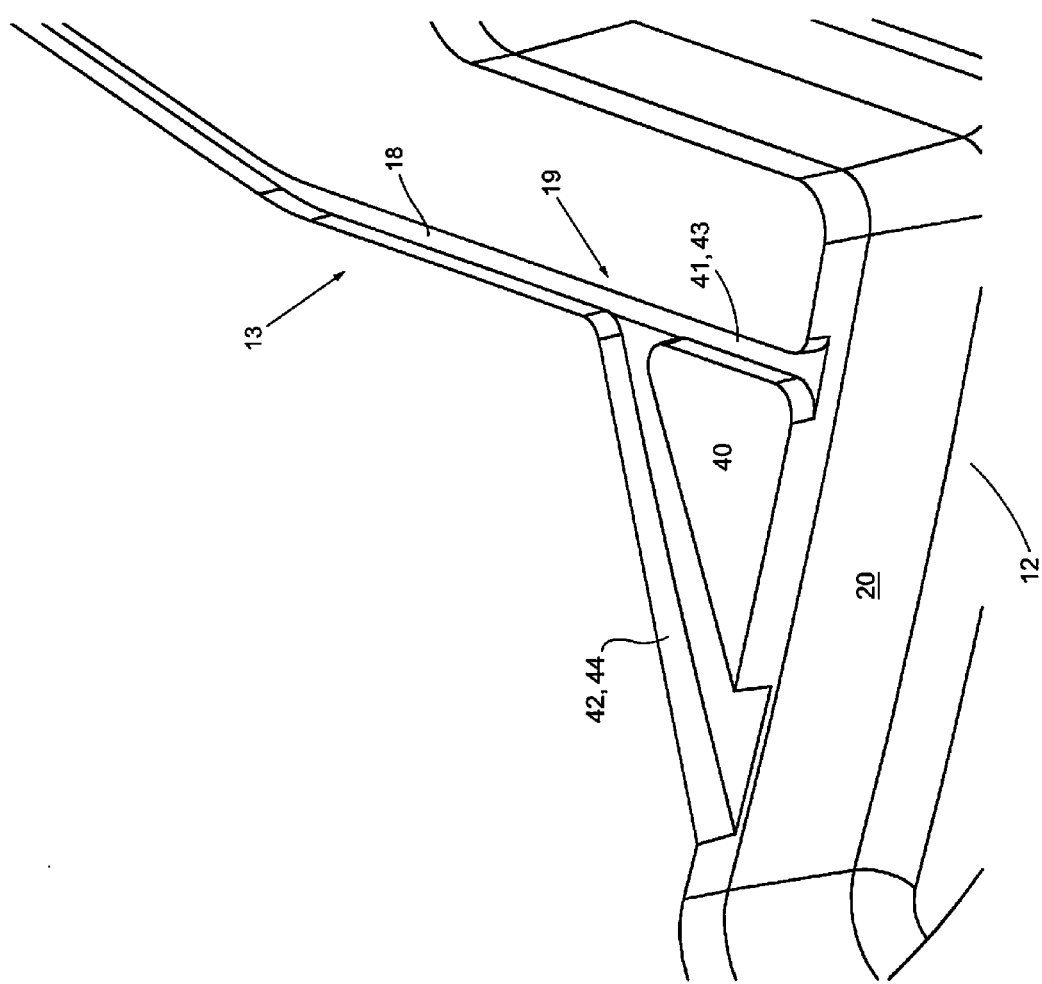
FIG. 9 shows a detailed view of the valve section of FIG. 8.

The main sub-channel 43 is aligned with the channel section 18, as can be seen in FIGS. 8, 9. FIG. 9 shows an isometric view of the valve section. The width and height of the main sub-channel 43 correspond to those of the channel section 18. The side walls of the main sub-channel 43 are typically parallel to each other. It is typically in the range of 0.14 mm to 0.2 mm high, particularly typically in the range of 0.15 mm to 0.18 mm. In the example shown here, the height of the main sub-channel 43 is equal to 0.15 mm; its width is 0.2 mm.

The bypass sub-channel 44 is typically wider than the main sub-channel 43. Typically, the bypass sub-channel 44 widens from the branching site 45 to a bypass inlet orifice 46 in the chamber wall 20 of the waste chamber 12. The fluid transport cross-section of the bypass sub-channel 44 thus enlarges in flow direction. The width of the bypass sub-channel 44 at the branching site 45 in the present example is 0.38 mm, while its width (parallel to the valve section side wall 26) is 0.6 mm at the bypass inlet orifice 46. The height of the bypass sub-channel 44 (in the Z-direction) at the bypass inlet orifice 46 should be in the range of 0.24 to 0.3 mm, typically in the range of 0.25 to 0.28 mm. In the embodiment shown, the height is 0.25 mm. The height of the waste chamber 12 in the example shown is 1.4 mm.

The height of the bypass sub-channel 44 at the chamber wall 20 is typically greater than the height of the main sub-channel 43 at the chamber wall 20 (FIG. 9). Typically, as shown here, the heights of the two sub-channels 41, 42 at the branching site 45 are the same.

In one embodiment (FIGS. 7 to 9) of the valve section 19, the main sub-channel 43 meets the chamber wall 20 of the waste chamber 12 at an angle that is other than 90 degrees. Typically, the main sub-channel 43 is positioned at right angles to the chamber wall 43.

In this embodiment as well, the relevant chamber cross-section Q near the chamber wall 20 is substantially larger than the fluid transport cross-section q at the inlet orifices 21 and 46. The valve function with a capillary stop and emptying the channel 8 in this chamber are also guaranteed. Typically, here again, the relevant chamber cross-section Q is determined at a distance of 0.2 mm from the chamber wall 20. The distance a is taken to be perpendicular to the chamber wall 20.

FIGS. 7, 8 show that the valve section 19 with the rib 40 forms a bypass sub-channel 44. The valve section 19 is typically positioned at the chamber 12 such that the bypass sub-channel 44 is positioned closer to the chamber side wall 25 than the main sub-channel 43. The spatial proximity of the bypass sub-channel 44 to the chamber side wall 25 means that the same effects are achieved as with the trumpet-shaped valve section. Here again, splitting of the fluid column during emptying is prevented and residual emptying is reliably ensured.

In the channel structure 7a (FIG. 3), the valve section 19 broadens trumpet-like in flow direction. The side wall 26 (right hand side wall) oriented against the direction of rotation R of the valve section 19 has been brought close to the chamber side wall 25. Since the microfluidic element 1 is turned in the clockwise direction (arrow R), when the element 1 accelerates, the fluid contained in the channel 8 is forced against the right hand side wall 22 of the channel 8. This side wall 22, 26 is close to the chamber side wall 25, whereupon emptying of the channel 8 is optimized by the Coriolis force arising during rotation and the Euler's force arising during acceleration. Venting and thus refilling of the channel 8 is effectively ensured.

In contrast, in the embodiment of the valve section 19 with a bypass in accordance with FIGS. 7, 8, 9, the bypass sub-channel 44 is close to the chamber side wall 25. In this case, rotation occurs counter-clockwise. Because of the Coriolis force arising during rotation and the Euler's force arising during acceleration, in this case, the fluid will be forced against the left hand wall 25 of the chamber 11 adjacent to the valve section sub-capillary 42 and support emptying of the bypass sub-channel 44. Build-up of a soap film when using washing buffer solutions is prevented. At the relatively narrower main sub-channel 43 of the valve section 19, soap film formation is not critical and not deleterious, since venting of the channel 13 can be efficiently carried out through the bypass sub-channel 44. Emptying the channel 13 and also breakthrough of the valve section 19 after reaching a pre-set breakthrough frequency (exceeding the breakthrough frequency by the rotational frequency) initially occurs via the bypass sub-channel 44, which is configured such that despite the broadening of its fluid transport cross-section, it remains capable of being filled under capillary action. The bypass sub-channel 44 is designed such that the fluid does not split towards the end of the emptying procedure and thus complete emptying and therefore venting is ensured. In this manner, the siphon-like construction of the siphon valve channel 13 can be used reliably many times.

The main sub-channel 43 acts to prevent reflux of fluid out of the chamber because the main sub-channel 43 is positioned away from the chamber side wall. Fluid that wets the chamber wall 20 and which flows back out of the waste chamber 12 along the chamber wall 20 in the direction of the valve section 19 is fed under capillary action into the narrower main sub-channel 43 which, because of its smaller cross-section, has a higher capillary effect than the bypass sub-channel 44. In this manner, the cohesive forces present mean that the returning flow of fluid is guided into the narrower main sub-channel 43 and does not reach the bypass sub-channel 44. Thus, the bypass sub-channel 44 does not block up and the transition is protected against reflux of fluid out of the chamber; particularly when the waste chamber is becoming increasingly full, this can be significant.

When the microfluidic element is stationary, fluid comes out of the measuring chamber 10 because of capillary action and flows into the channel 13. In this regard, initially, the narrower main sub-channel 43 fills up relatively quickly. Only then is the bypass sub-channel 44 filled, whereby filling thereof is slower than filling of the main sub-channel 43. An appropriate configuration of the two sub-channels 41, 42, in particular by broadening the bypass sub-channel 44 and setting the angle between the two sub-channels 41, 42, means that filling can be adjusted, as a function of the capillary forces which arise.

As soon as the microfluidic element is set in rotation, initially, breakthrough occurs at the bypass sub-channel 44. This occurs even at relatively low frequencies. Thus, in biochemical analytical processes (assays), it is possible to empty the chamber carefully in order to prevent damage to proteins, for example.

With a valve section 19 in accordance with the present disclosure, a plurality of process steps (assay steps) can be carried out robustly using the same capillaries or using the same channels 8, 13, without leading to a blockage of the channel. Venting of the capillaries (channel 8, 13) is also guaranteed over multiple process steps, i.e., introducing various fluids a number of times. Thus, even solutions with a high detergent concentration can be used without soap film being built up or without residual solution (fluid) running together and refilling the channels.

It is noted that terms like "preferably", "commonly" and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present disclosure.

For the purposes of describing and defining the present disclosure it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these preferred aspects.

What is claimed is:

1. A microfluidic element for analyzing a fluid sample, said microfluidic element comprising a substrate and a microfluidic transport system having a channel structure, the microfluidic transport system being enclosed by the substrate and a covering layer, wherein
    the channel structure comprises a channel with two side walls, and a chamber which adjoins the channel,
    the channel comprises a channel section and a valve section adjoining the channel section,
    the two side walls run parallel to each other in the channel section,
    the chamber has a chamber wall with an inlet orifice in which area of the chamber wall is greater than area of the inlet orifice in the same plane, and the chamber has a chamber side wall that adjoins the chamber wall,
    the inlet orifice in the chamber wall adjoins the valve section, so that a fluid can flow out of the channel through the inlet orifice of the chamber wall and into the chamber,
    the valve section is provided with a fluid transport cross-section that enlarges in width in a flow direction, wherein in width, the fluid transport cross-section of the valve section at the inlet orifice is larger than a fluid transport cross-section in the channel section at a transition from the channel section to the valve section, and wherein the fluid transport cross-section of the valve section enlarges continuously from the transition to the inlet orifice, and
    an end of the valve section, which has dimensions which differ from the chamber, forms a capillary stop such that a fluid flowing through the channel is stopped at the end of the valve section at the inlet orifice of the chamber, and wherein the valve section has a length l, which is at least three times a distance b between side walls of the valve section at the transition from the channel section to the valve section.

2. The microfluidic element according to claim 1, wherein, perpendicular to the chamber wall and at a distance of 0.2 mm from the inlet orifice, the fluid transport cross-section of the chamber is at least 1.5 times greater than the fluid transport cross-section of the end of the valve section at the inlet orifice.

3. The microfluidic element according to claim 2, wherein, perpendicular to the chamber wall and at a distance of 0.2 mm from the inlet orifice, the fluid transport cross-section of the chamber is at least double the fluid transport cross-section of the end of the valve section at the inlet orifice.

4. The microfluidic element according to claim 2, wherein, perpendicular to the chamber wall and at a distance of 0.2 mm from the inlet orifice, the fluid transport cross-section of the chamber is at least four times greater than the fluid transport cross-section of the end of the valve section at the inlet orifice.

5. The microfluidic element according to claim 1, wherein a distance between side walls in the end of the valve section at the inlet orifice of the chamber is at least double the distance between the side walls in the channel section.

6. The microfluidic element according to claim 1, wherein a distance between side walls in the end of the valve section at the inlet orifice of the chamber is at least three times greater than the distance between the side walls in the channel section.

7. The microfluidic element according to claim 1, wherein a distance between side walls in the end of the valve section at the inlet orifice of the chamber is at least four times greater than the distance between the side walls in the channel section.

8. The microfluidic element according to claim 1, wherein the length l is at least five times the distance b.

9. The microfluidic element according to claim 1, wherein the length l is at least seven times the distance b.

10. The microfluidic element according to claim 1, wherein the length l corresponds to at most ten times the distance b.

11. The microfluidic element according to claim 1, wherein the valve section has a constant height h or a height that increases towards the inlet orifice of the chamber.

12. The microfluidic element according to claim 1, wherein the chamber comprises a ramp that extends away from the inlet orifice of the chamber wall in a manner such that its height reduces with increasing distance from the chamber wall.

13. The microfluidic element according to claim 12, wherein the width of the ramp is greater than the width of the inlet orifice.

14. The microfluidic element according to claim 12, wherein the width of the ramp is at least 10% greater than the width of the inlet orifice.

15. The microfluidic element according to claim 12, wherein the width of the ramp is at least double the width of the inlet orifice.

16. The microfluidic element according to claim 12, wherein the width of the ramp is at least three times greater than the width of the inlet orifice.

17. The microfluidic element according to claim 12, wherein the width of the ramp is at most five times greater than the width of the inlet orifice.

18. The microfluidic element according to claim 1, wherein the end of the valve section is positioned at the chamber wall such that a side wall of the valve section is positioned close to the chamber side wall such that the distance between the side wall of the valve section and the chamber side wall is at most equal to the width of the channel section.

19. The microfluidic element according to claim 18, wherein the distance between the side wall of the valve section positioned close to the chamber side wall and the chamber side wall is at most equal to half the width of the channel section.

20. The microfluidic element according to claim 18, wherein the distance between the side wall of the valve section positioned close to the chamber side wall and the chamber side wall is at most equal to one third of the width of the channel section.

21. The microfluidic element according to claim 1, wherein a rib is positioned in the valve section between two valve section side walls such that two adjacent valve section sub-channels are formed, which both end at the chamber wall of the chamber and in which one of the valve section sub-channels is narrower than the other, wherein the distance of the first valve section sub-channel from the second valve section sub-channel at the chamber wall is at least twice the width of the narrower valve section sub-channel.

22. The microfluidic element according to claim 21, wherein the distance of the first valve section sub-channel from the second valve section sub-channel at the chamber wall is at least four times larger than the width of the narrower valve section sub-channel.

23. The microfluidic element according to claim 21, wherein the distance of the first valve section sub-channel from the second valve section sub-channel at the chamber wall is at least six times larger than the width of the narrower valve section sub-channel.

24. The microfluidic element according to claim 21, wherein the two adjacent valve section sub-channels each form a capillary stop with the chamber configured as a geometric valve.

25. The microfluidic element according to claim 21, wherein the rib is positioned such that the two sub-channels form an angle of at least 40 degrees.

26. The microfluidic element according to claim 21, wherein the rib is positioned such that the two sub-channels form an angle of at least 50 degrees.

27. The microfluidic element according to claim 21, wherein the rib is positioned such that the two sub-channels form an angle of at least 60 degrees.

28. The microfluidic element according to claim 21, wherein the first sub-channel is a main sub-channel and the second sub-channel is a bypass sub-channel.

29. The microfluidic element according to claim 28, wherein the bypass sub-channel is wider than the main sub-channel.

30. The microfluidic element according to claim 28, wherein side walls of the main sub-channel run parallel to each other.

31. The microfluidic element according to claim 28, wherein the main sub-channel is aligned with the channel section.

32. The microfluidic element according to claim 28, wherein the chamber comprises a chamber side wall adjoining the chamber wall, and the bypass sub-channel of the valve section is positioned closer to the chamber side wall than the main sub-channel of the valve section.

33. The microfluidic element according to claim 28, wherein the height of the bypass sub-channel at a bypass inlet orifice of the chamber is greater than the height of the main sub-channel at the inlet orifice of the chamber.

34. The microfluidic element according to claim 33, wherein the heights of the bypass sub-channel and the main sub-channel at the transition to the channel section are equal.

35. The microfluidic element according to claim 33, wherein the channel structure of the microfluidic transport system is formed in the substrate.

36. A microfluidic element for analyzing a fluid sample, said microfluidic element comprising a substrate and a microfluidic transport system having a channel structure, the microfluidic transport system being enclosed by the substrate and a covering layer, wherein the channel structure comprises a channel with two side walls, and a chamber which adjoins the channel, the channel comprises a channel section and a valve section adjoining the channel section, the two side walls run parallel to each other in the channel section, the chamber has a chamber wall with an inlet orifice in which area of the chamber wall is greater than area of the inlet orifice in the same plane, and the chamber has a chamber side wall that adjoins the chamber wall, the inlet orifice in the chamber wall adjoins the valve section, so that a fluid can flow out of the channel through the inlet orifice of the chamber wall and into the chamber, the valve section is provided with a fluid transport cross-section that enlarges in width in a flow direction, wherein in width, the fluid transport cross-section of the valve section at the inlet orifice is larger than a fluid transport cross-section in the channel section at a transition from the channel section to the valve section, and wherein the fluid transport cross-section of the valve section enlarges continuously from the transition to the inlet orifice, and an end of the valve section, which has dimensions which differ from the chamber, forms a capillary stop such that a fluid flowing through the channel is stopped at the end of the valve section at the inlet orifice of the chamber, and wherein a rib is positioned in the valve section between two valve section side walls such that two adjacent valve section sub-channels are formed, which both end at the chamber wall of the chamber and in which one of the valve section sub-channels is narrower than the other, wherein the distance of the first valve section sub-channel from the second valve section sub-channel at the chamber wall is at least twice the width of the narrower valve section sub-channel.

* * * * *